US011168028B2

(12) United States Patent
Kinney et al.

(10) Patent No.: US 11,168,028 B2
(45) Date of Patent: Nov. 9, 2021

(54) ADDITIVES FOR GEOPOLYMER CEMENTS

(71) Applicant: Cemalt LLC, Alexandria, VA (US)

(72) Inventors: Frederick D. Kinney, Dublin, OH (US); Rajeshkumar D. Patel, Catonsville, MD (US)

(73) Assignee: CEMALT LLC, Alexandria, VA (US)

( * ) Notice: Subject to any disclaimer, the term of this patent is extended or adjusted under 35 U.S.C. 154(b) by 96 days.

(21) Appl. No.: 16/671,277

(22) Filed: Nov. 1, 2019

(65) Prior Publication Data

US 2020/0140333 A1    May 7, 2020

Related U.S. Application Data

(60) Provisional application No. 62/755,431, filed on Nov. 3, 2018.

(51) Int. Cl.
| | | |
|---|---|---|
| *C04B 28/08* | (2006.01) | |
| *C04B 22/14* | (2006.01) | |
| *C04B 18/08* | (2006.01) | |
| *C04B 22/10* | (2006.01) | |
| *C04B 14/04* | (2006.01) | |
| *C04B 24/04* | (2006.01) | |
| *C04B 22/06* | (2006.01) | |
| *C04B 103/12* | (2006.01) | |

(52) U.S. Cl.
CPC .......... *C04B 28/08* (2013.01); *C04B 14/043* (2013.01); *C04B 18/08* (2013.01); *C04B 22/062* (2013.01); *C04B 22/10* (2013.01); *C04B 22/148* (2013.01); *C04B 24/04* (2013.01); *C04B 2103/12* (2013.01); *C04B 2201/50* (2013.01)

(58) Field of Classification Search
CPC ..... C04B 7/1535; C04B 14/043; C04B 18/08; C04B 22/062; C04B 22/10; C04B 22/148; C04B 24/04; C04B 28/08; C04B 2103/12; C04B 2201/50
See application file for complete search history.

(56) References Cited

U.S. PATENT DOCUMENTS

2014/0047999 A1    2/2014    Razl
2015/0101512 A1    4/2015    Schumacher et al.

FOREIGN PATENT DOCUMENTS

| | | | | |
|---|---|---|---|---|
| CN | 100371418 C | | 2/2006 | |
| CN | 101100854 A | * | 1/2008 | ............. C04B 28/26 |
| CN | 100371418 C | * | 2/2008 | |
| CN | 101265069 A | | 9/2008 | |
| CN | 105461265 A | * | 4/2016 | |
| CN | 105731859 A | * | 7/2016 | |
| SU | 1320200 A1 | * | 6/1987 | ............. C04B 28/08 |

OTHER PUBLICATIONS

PCT International Search Report and the Written Opinion, PCT/US2019/059303, dated Dec. 24, 2019, 10 pages.

* cited by examiner

*Primary Examiner* — Anthony J Green
(74) *Attorney, Agent, or Firm* — Edell, Shapiro & Finnan LLC

(57) ABSTRACT

The present disclosure is directed to chemical additives for geopolymer cements that can improve the rheological properties of geopolymer cements. These chemical additives include sulfates and selenates of a specific formula as well as hydroxycarboxylic acid salts of Li, Na, and K including but not limited to glycolic, lactic, citric, mandelic tartaric, and malic acids. The chemical additives for geopolymer cements disclosed herein can facilitate the uniform mixing, increase the time mixtures can be transported, and improve the ability to place and finish concrete and mortars made with the geopolymer cements.

15 Claims, 3 Drawing Sheets

ADDITIVES FOR GEOPOLYMER CEMENTS

CROSS REFERENCE TO RELATED APPLICATIONS

The present application is a non-provisional application of U.S. Provisional Application No. 62/755,431, entitled "ADDITIVES FOR GEOPOLYMER CEMENTS", filed Nov. 3, 2018, the disclosure of which is hereby incorporated by reference in its entirety.

FIELD OF THE DISCLOSURE

This disclosure relates to chemical additives for geopolymer cements. More specifically, this disclosure relates to sulfates and selenates of a specific formula as well as hydroxycarboxylic acid salts of Li, Na, and K including but not limited to glycolic, lactic, citric, mandelic tartaric, and malic acids used as additives for geopolymer cements.

BACKGROUND

Geopolymer cements, also known as alkali activated cements, are very low carbon emission replacements for Portland cement. There are two basic types of geopolymer cements: (1) those that are self-setting and gain strength without addition of external energy; and (2) those that require heat curing to set and gain strength. The first type of geopolymer cement usually consists of a finely divided powder containing ground granulated blast furnace slag, blended or interground with a pozzolan usually class F fly ash. The second type of geopolymer cement usually consists of any combination of finely divided pozzolonic materials including class F fly ash, clay, volcanic glass, waste glass, and silica fume. Both basic types of geopolymer cements can be activated with the same chemicals which include alkali silicate, alkali hydroxide, and/or alkali carbonate.

Unfortunately, geopolymer cements have been mostly limited to the manufacture of precast concrete shapes due to their rapid loss of workability and poor rheological properties that make concrete made with them difficult to mix, place, and finish by conventional methods. In addition, high alkali activator dosage is often needed to achieve desired compressive strength. This can lead to short working time and setting time (e.g., as short as 10 minutes). Geopolymer cements can be made more rheologically friendly by the addition of typical chemicals that retard the chemical reactions responsible for setting. However, these typical additives can slow timely setting and strength development which limits the number of applications for which geopolymer cements can be used.

SUMMARY

Provided are chemical additives for geopolymer cements that can improve the rheological properties of geopolymer cements without retarding the time setting or the early strength development. Such chemical additives can provide a significant environmental benefit by allowing for more Portland cement to be replaced by lower carbon emission cements. In addition, the chemical additives for geopolymer cements disclosed herein can facilitate the uniform mixing, increase the time mixtures can be transported, and improve the ability to place and finish concrete and mortars made with the geopolymer cements.

Reference to "about" a value or parameter herein includes (and describes) variations that are directed to that value or parameter per se. For example, description referring to "about X" includes description of "X". In addition, reference to phrases "less than", "greater than", "at most", "at least", "less than or equal to", "greater than or equal to", or other similar phrases followed by a string of values or parameters is meant to apply the phrase to each value or parameter in the string of values or parameters. For example, a statement that the cementitious compositions disclosed herein can have less than about 1 wt. %, about 0.5 wt. %, about 0.1 wt. %, or about 0.01 wt. % Portland cement, is meant to mean that the Portland cement in the cementitious composition can be less than about 1 wt. %, less than about 0.5 wt. %, less than about 0.1 wt. %, or less than about 0.01 wt. %.

As used herein, the singular forms "a," "an," and "the" are intended to include the plural forms as well, unless the context clearly indicates otherwise. It is also to be understood that the term "and/or" as used herein refers to and encompasses any and all possible combinations of one or more of the associated listed items. It is further to be understood that the terms "includes, "including," "comprises," and/or "comprising," when used herein, specify the presence of stated features, integers, steps, operations, elements, components, and/or units but do not preclude the presence or addition of one or more other features, integers, steps, operations, elements, components, units, and/or groups thereof.

Additional advantages will be readily apparent to those skilled in the art from the following detailed description. The examples and descriptions herein are to be regarded as illustrative in nature and not restrictive.

BRIEF DESCRIPTION OF THE DRAWINGS

Exemplary embodiments are described with reference to the accompanying figures, in which.

DETAILED DESCRIPTION

Figure 1:
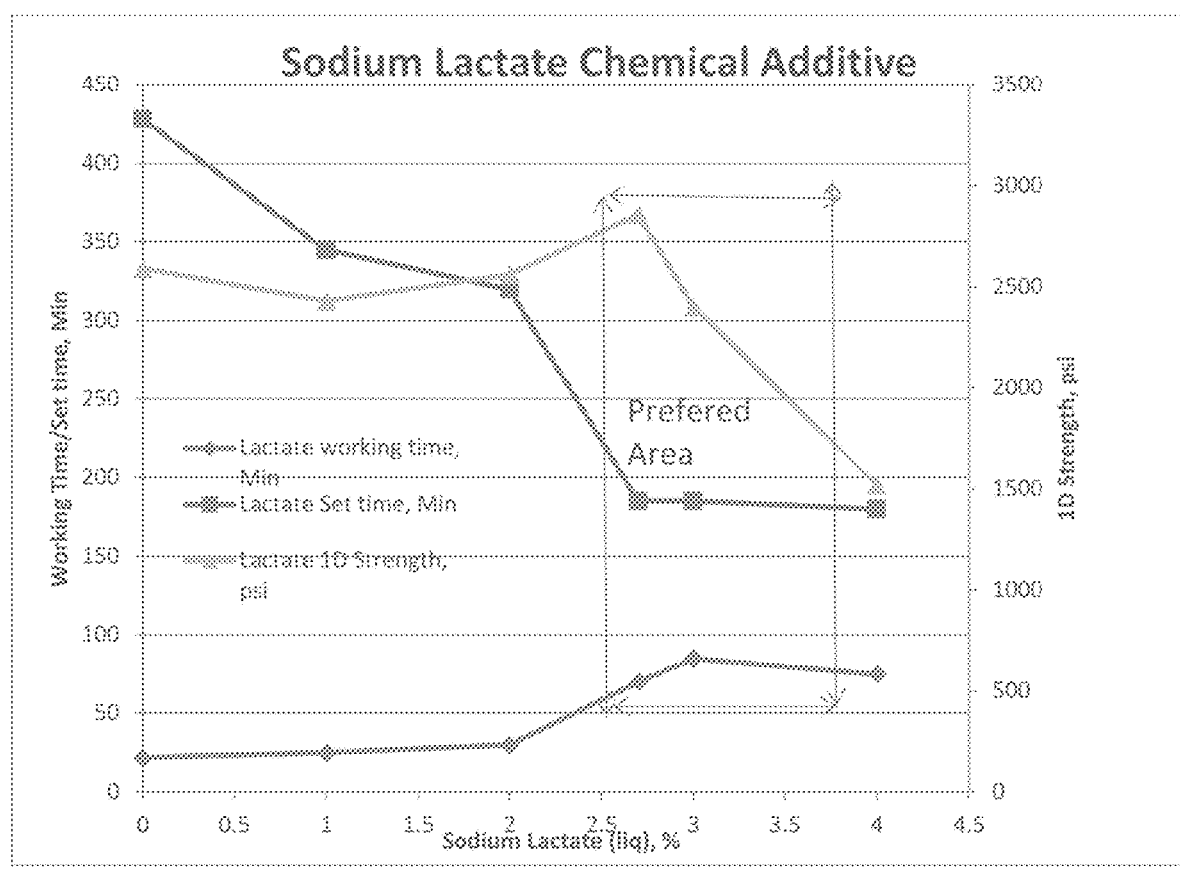
FIG. 1 is a chart illustrating the sodium lactate percentage versus the working time, the set time, and 1 D compressive strength of mortar formed with sodium lactate additive.

Provided are chemical additives for geopolymer cements that can produce a flowable concrete that is easy to mix, place, and finish. In addition to being suitable for normal construction and precast applications, concrete made with the geopolymer cements disclosed herein can be resistant to sulfate and/or chloride attacks because of its chemical composition.

Accordingly, concretes made with the geopolymer cements disclosed herein can be well-suited for use in high sulfate soils, construction, and marine structures such as ports and seawalls. In addition, the chemical additives for geopolymer cements disclosed herein can improve the rheological properties of geopolymer cements without retarding the time setting or the early strength development properties.

Like fly ash, Ground Granulated Blast Furnace Slag (GGBFS) is another pozzolanic material used in Portland cement concrete. It is the by-product of the iron and steel making industries. It can be obtained by quenching molten iron slag from a blast furnace in water or steam to produce a glassy, granular product that can be dried and ground into fine powder. The Portland cement industry has for some time elected to inter-grind Portland clinkers with GGBFS (slag) typically in the 30-50% range. In some markets, ready-mix concrete (RMC) plants are also blending fine slag powder with Portland cement.

As stated above, the principal limitation to the successful commercialization of alkali activated slag cement (AASC) concrete is due to its poor workability. Specifically, its inability to provide sufficient working and placing time. Applicants have discovered chemical additives for alkali activated cements (i.e., geopolymer cements) that improves rheological properties such as working time, placing time, pot life, flow-ability, flow retention of mortar, and slump retention of concrete.

The cementitious compositions disclosed herein can include slag. In some embodiments, the slag is ground granulated blast furnace slag ("GGBFS") or any other metallurgical slags such as steel, copper or cuela. In some embodiments, the slag is in powder form. In some embodiments, the slag is greater than or equal to about 5 wt % of the cementitious composition.

In some embodiments, the cementitious compositions can also include a pozzolanic material. In some embodiments, the pozzolanic material can include fly ash, bottom ash, clay calcined clay, glass, volcanic class, pumice, diatomatceous earth, silica fume, other alumino-silica glass, or combinations thereof. In some embodiments, the pozzolanic material is Class F fly ash. In some embodiments, the pozzolanic material can be a finely divided glassy alumino-silicate powder. In some embodiments, the pozzolanic material is in powder form. In some embodiments, the pozzolanic material can be less than or equal to 95 wt % of the cementitious composition.

In some embodiments, the slag to pozzolanic material in the cementitious composition can be in a certain weight ratio. In some embodiments, the weight ratio of slag to pozzolanic material can be about 100/0 to about 40/60, about 90/10 to about 50/50, about 87/13 to about 60/40, about 85/15 to about 65/35, about 80/20 to about 70/30, or about 75/25. The mixture of slag and pozzolanic material can be a blend of dry powders.

In some embodiments, the cementitious compositions can include alkali activators or blends of alkali activators to activate the cementitious compositions. These alkali activators can include hydroxides, carbonates, and/or silicates. In some embodiments, the alkali activators can include sodium hydroxide, potassium hydroxide, sodium carbonate, potassium carbonate, sodium silicate, and/or potassium silicate. In some embodiments, the alkali activators can include sodium/potassium hydroxide and sodium/potassium carbonate or sodium/potassium silicate. In some embodiments, the alkali activators can include sodium hydroxide and sodium silicate or sodium carbonate.

In some embodiments, the sodium or potassium hydroxide can be about 0.1-20 wt %, about 0.1-10 wt %, about 0.1-5 wt %, about 1-5 wt %, about 1-4 wt %, about 2-4 wt %, or about 2-3 wt % the cementitious composition. In some embodiments, the sodium or potassium carbonate can be about 0.1-20 wt %, about 0.1-15 wt. %, about 1-10 wt. %, about 1-9 wt %, about 2-8 wt. %, about 3-6 wt. %, about 4-6 wt. %, or about 4-5 wt. % the cementitious composition. In some embodiments, the sodium or potassium silicate can be about 0.1-20 wt %, about 0.1-15 wt. %, about 1-10 wt. %, about 1-9 wt %, about 2-8 wt. %, about 3-6 wt. %, about 4-6 wt. %, or about 4-5 wt. % the cementitious composition.

Besides the above components in the cementitious composition, Applicants have unexpectedly discovered that including a chemical additive can improve the workability of the subsequent geopolymer cements. Specifically, the chemical additives can facilitate the mixing, increase the time mixtures can be transported, and can improve the ability to place and finish the geopolymer concrete mixtures. These chemical additives can include sulfate and selenate compounds of the following formulas:

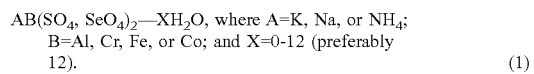

$AB(SO_4, SeO_4)_2$—$XH_2O$, where A=K, Na, or $NH_4$; B=Al, Cr, Fe, or Co; and X=0-12 (preferably 12).     (1)

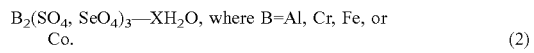

$B_2(SO_4, SeO_4)_3$—$XH_2O$, where B=Al, Cr, Fe, or Co.     (2)

In some embodiments, the chemical additive of formula (1) is an alum. For example, the chemical additive of formula (1) can be $KAl(SO_4)_2$. In some embodiments, the chemical additive of formula (2) is aluminum sulfate (i.e., $Al_2(SO_4)_3$).

In some embodiments, the chemical additives can be about 0.1-5 wt % or about 0.1-4 wt. % the cementitious composition. In some embodiments, a chemical additive of formula (1) can be about at least 0.1 wt % the cementitious composition. In some embodiments, a chemical additive of formula (2) can be about at least 0.4 wt % the cementitious composition. In some embodiments, a chemical additive of formula (1) or (2) can be about less than 5 wt % but more than 0.1 wt. % the cementitious composition.

In some embodiments, the chemical additives can be hydroxycarboxylic acid salts of Li, Na, and K including but not limited to glycolic, lactic, citric, mandelic tartaric, and malic acids. In some embodiments, the chemical additives can be hydroxycarboxylic acids including but not limited to glycolic, lactic, citric, mandelic, tartaric, acetic, andlic neutralized with Li, Na, or K hydroxides or carbonates. For example, the chemical additive can be sodium lactate. The sodium lactate can be in liquid form. In some embodiments, the sodium lactate can have a 60% solids content.

In some embodiments, a hydroxycarboxylic acid salt chemical activator can be at least about 1 wt % of the cementitious composition.

In some embodiments, the cementitious compositions disclosed herein can be substantially free from Portland cement. In some embodiments, the cementitious compositions disclosed herein can have less than about 1 wt % Portland cement. In some embodiments, the cementitious compositions disclosed herein can have no Portland cement.

In some embodiments, stable dry powders of these chemical additives can be interblended or interground with the finely divided powders of geopolymers. The chemical additives that cannot be supplied as powders can be added as liquids to the concrete or mortar mixture containing the finely divided powders.

In some embodiments, the chemical additives can be added to the blend of dry finely divided slag-pozzolan powders to make concrete or mortar with mixing water into a suitable mixer or can be interground in a grinding mill. When interground with the slag-pozzolan blend, the resulting powder can be used as any other cementitious powder to make concrete or mortar.

The chemical additives added to geopolymer cements can improve the rheological properties of concrete and mortars made with the cements without retarding the time of setting or strength development of concrete with which they are made.

Mortar formed from the cementitious compositions described herein can have improved flow (ASTM C 1437), working time/pot life (time interval between addition of water to the time when mortar flow is reduced to 50%), set time (ASTM C 403), and compressive strength (ASTM C 109).

In some embodiments, the flow of mortar produced using the cementitious compositions described herein can greater than 100% as determined by test method ASTM C1437.

In some embodiments, the working time of mortar produced using the cementitious compositions described herein can be at least about 30 minutes, about 45 minutes, about 50 minutes, about 55 minutes, about 60 minutes, about 65 minutes, about 70 minutes, about 75 minutes, or about 80 minutes. In some embodiments, the working time of mortar produced using cementitious compositions described herein can be at most about 5 hours, about 4.5 hours, about 4.25 hours, about 4 hours, about 3.75 hours, about 3.5 hours, or about 3 hours. In some embodiments, the working time of mortar produced using the cementitious compositions described herein can be about 30-300 minutes, about 45-275 minutes, or about 60-240 minutes.

In some embodiments, the set time of mortar produced using the cementitious compositions described herein can be at least about 3 hours, about 3.5 hours, about 3.75 hours, about 4 hours, about 4.5 hours, about 5 hours, or about 6 hours. In some embodiments, the set time of mortar produced using the cementitious compositions described herein can be at most about 14 hours, about 13 hours, about 12.5 hours, about 12 hours, about 11 hours, about 10 hours, about 9 hours, or about 8 hours. In some embodiments, the set time of mortar produced using the cementitious compositions described herein can be about 2-15 hours, about 3-13 hours, or about 4-12 hours.

In some embodiments, the 1D compressive strength of mortar produced using the cementitious compositions described herein can be at least about 1500 psi, about 1600 psi, about 1700 psi, about 1800 psi, about 1900 psi, or about 2000 psi. In some embodiments, the 7D compressive strength of mortar produced using the cementitious compositions described herein can be at least about 3000 psi, about 3250 psi, about 3500 psi, about 3750 psi, or about 4000 psi. In some embodiments, the 28D compressive strength of mortar produced using the cementitious compositions described herein can be at least about 4000 psi, about 4500 psi, about 4750 psi, about 5000 psi, about 5250 psi, about 5500 psi, or about 5750 psi.

Concrete formed from the cementitious compositions described herein can have improved slump (ASTM C 143), working time (time interval between addition of water to concrete to reach 2 inch slump), set time (ASTM C 403), compressive strength (ASTM C 39); flexural strength (ASTM C 78); splitting tensile strength (ASTM 496); modulus of elasticity (ASTM 469); bond strength (slant shear) (ASTM C 882); length change (ASTM C 157); and rapid chloride permeability (ASTM C 1202).

In some embodiments, the slump of concrete produced using the cementitious compositions described herein can be 0.0-10 inches.

In some embodiments, the working time of concrete produced using the cementitious compositions described herein can be 45-90 minutes.

In some embodiments, the set time of concrete produced using the cementitious compositions described herein can be 3-7 hours.

In some embodiments, the compressive strength of concrete produced using the cementitious compositions described herein can be 2000-8000 psi.

In some embodiments, the flexural strength of concrete produced using the cementitious compositions described herein can be 500-700 psi.

In some embodiments, the splitting tensile strength of concrete produced using the cementitious compositions described herein can be 500-700 psi.

In some embodiments, the modulus of elasticity of concrete produced using the cementitious compositions described herein can be 4-5 million psi.

In some embodiments, the bond strength of concrete produced using the cementitious compositions described herein can be 700-800 psi.

In some embodiments, the length change of concrete produced using the cementitious compositions described herein can be 0-0.04%.

In some embodiments, the rapid chloride permeability of concrete produced using the cementitious compositions described herein can be less than 1000 coulombs.

The cements disclosed herein are alternatives to the traditional clinker based Portland cements. Given that no or minimal $CO_2$ is emitted during the production of the cements disclosed herein, the adaptation of this technology can significantly reduce carbon emissions. Beyond the benefit of a zero or minimal carbon footprint, the cements disclosed herein can also enable greater beneficial use of waste materials (both slag and fly ash). Finally, due to its excellent resistance to chloride and sulfate attacks, the cements disclosed herein can have a longer life cycle than traditional Portland cements.

EXAMPLES

Mortar Examples

Cement ingredients: slag (GGBFS); ASTM Class F Fly Ash; Sodium Hydroxide; Sodium Silicate or Sodium Carbonate; and a chemical additive such as Alum ($KAl(SO_4)_2$), Aluminum Sulfate, or Sodium Lactate Liquid (60% solids content).

Mortar ingredients: 1 part cement; 2 parts ASTM C33 Sand; and water 38.5% of cement weight (i.e., water/cement=0.385).

Mortar Test Methods: Flow Test=ASTM C 1437; Working time/Pot life time=time interval between addition of water to the time when mortar flow is reduced to 50%; Set Time=ASTM C 403; and Compressive Strength=ASTM C 109.

The following Table 1 provides the working time, set time, and compressive strength for mortar produced using alkali activators sodium hydroxide and sodium carbonate with chemical additive sodium lactate (liquid).

TABLE 1

Sodium hydroxide and Sodium Carbonate with Sodium Lactate (liquid) Slag (GGBFS) activation

| Example | Data | Working time, Min | Final set, Min | Compressive strength, Psi | | | |
|---|---|---|---|---|---|---|---|
| | | | | 24 H | 3 D | 7 D | 28 D |
| Comp. Example 1 | Slag/classF (87/13), Sodium Hydroxide 1%, Sodium Carbonate 9% | 22 Min | 7 H: 08 M | 2591 | 2 D: 4563 | 6784 | 7437 |
| Example 1 | Slag/classF (87/13), Sodium Hydroxide 1%, Sodium carbonate 9%, Sodium Lactate (Liq) 3% | 70 Min | 3 H: 05 M | 2859 | 4219 | 5399 | 7343 |
| Example 2 | Slag/F (87/13), Sodium Hydroxide 1%, Sodium Carbonate 7%, Sodium Lactate 3% (Liq) | 75 Min | 13 H: 58 M | 614 | 4669 | 6540 | 7491 |
| Example 3 | Slag/F (87/13), Sodium Hydroxide 1%, Sodium Carbonate 5%, Sodium Lactate 3% (liquid) | 105 Min | 16 H: 25 M | 356 | 4474 | 5954 | 7702 |
| Example 4 | Slag/classF (87/13), Sodium Hydroxide 1%, Sodium carbonate 9%, Sodium Lactate (Liq) 1% | <30 min | 5 H: 45 M | 2431 | 4897 | 6523 | 7235 |
| Example 5 | Slag/classF (87/13), Sodium Hydroxide 1%, Sodium carbonate 9%, Sodium Lactate (Liq) 2% | 30 Min | 5 H: 20 M | 2561 | 4419 | 6599 | 7243 |
| Example 6 | Slag/classF (87/13), Sodium Hydroxide 1%, Sodium carbonate 9%, Sodium Lactate (Liq) 4% | 75 Min | 3 H | 1520 | 3620 | 4850 | 7015 |

As shown in Table 1 above, the control Mortar mixture (comparative example 1) provides only 22 minutes of working time. In contrast, example 1 provides 70 minutes working time without affecting strength.

Table 2 provides the working time, set time, and compressive strength for mortar produced using alkali activators sodium hydroxide and sodium silicate with chemical additive sodium lactate (liquid).

TABLE 2

Sodium hydroxide and Sodium silicate with Sodium Lactate (liquid) Slag (GGBFS) activation

| Example | Data | Working time, Min | Final set, Min | Compressive strength, Psi | | | |
|---|---|---|---|---|---|---|---|
| | | | | 24 H | 3 D | 7 D | 28 D |
| Comparative Example 2 | Slag/classF (87/13), Sodium Hydroxide 3%, Sodium silicate 5% Control Mix (No chemical additive) | 20 Min | 2 H: 17 M | 3000 | 2 D: 3555 | 5819 | 7750 |
| Example 7 | Slag/classF (87/13), Sodium Hydroxide 1%, Sodium Silicate 2%, Sodium Lactate (liquid) 3%, | 2 H: 30 M | <20 H | 1339 | 4067 | 5602 | 7488 |
| Example 8 | Slag/classF (87/13), Sodium Hydroxide 1%, Sodium Silicate 3%, Sodium Lactate (liquid) 3%, | 2 H: 30 M | 18 H: 10 M | 2 D: 2684 | 4356 | 6434 | 7779 |
| Example 9 | Slag/classF (87/13), Sodium Hydroxide 1%, Sodium Silicate 5%, Sodium Lactate (liquid) 3%, | 1 H: 16 M | 14 H: 25 M | 2 D: 437 | 3242 | 6236 | 8733 |
| Example 10 | Slag/classF (87/13), Sodium Hydroxide 3%, Sodium Silicate 5%, Sodium Lactate (liquid) 3%, | 82 min | 5 H: 19 M | 2440 | NA | 5202 | 7241 |

TABLE 2-continued

Sodium hydroxide and Sodium silicate with Sodium Lactate (liquid)
Slag (GGBFS) activation

| Example | Data | Working time, Min | Final set, Min | Compressive strength, Psi | | | |
|---|---|---|---|---|---|---|---|
| | | | | 24 H | 3 D | 7 D | 28 D |
| Example 11 | Slag/classF (87/13), Sodium Hydroxide 3%, Sodium Silicate 8%, Sodium Lactate (liquid) 3%, | 80 min | 8 H: 30 M | 3697 | NA | 7181 | 9855 |
| Example 12 | Slag/classF (87/13), Sodium Hydroxide 3%, Sodium Silicate 10%, Sodium Lactate (liquid) 3%, | 75 min | 6 H: 20 M | 3619 | NA | 7180 | 8673 |

As shown in Table 2 above, the control Mortar mixture (comparative example 2) provides only 20 minutes of working time. In contrast, example 10 provides 82 minutes working time without affecting strength.

Table 3 provides the working time, set time, and compressive strength for mortar produced using alkali activators sodium hydroxide and sodium silicate with chemical additive Alum.

TABLE 3

Sodium hydroxide and Sodium Silicate with chemical additive, Alum
Slag (GGBFS) activation, ASHVC-L Mortar formula

| Examples | Data | Working time, Min | Final set, Min | Compressive strength, Psi | | | |
|---|---|---|---|---|---|---|---|
| | | | | 24 H | 3 D | 7 D | 28 D |
| Comparative Example 3 | Slag/classF (87/13), Sodium Hydroxide 3%, Sodium silicate 5% Control Mix (No chemical additive) | 20 Min | 2 H: 17 M | 3000 | 2 D: 3555 | 5819 | 7750 |
| Example 13 | Slag/classF (87/13), Sodium Hydroxide 3%, Sodium Silicate 5%, No Lactate, Alum 0.25% | 4 H | 12 H: 52 M | 2148 | 2 D: 3313 | 5425 | 7895 |
| Example 14 | Slag/classF (87/13), Sodium Hydroxide 3%, Sodium Silicate 5%, No Lactate, Alum 0.5% | 6 H | 16 H | 1588 | 4 D: 4163 | 4813 | 7755 |
| Example 15 | Slag/classF (87/13), Sodium Hydroxide 3%, Sodium Silicate 5%, No Lactate, Alum 1% | >8 H | 20 H: 20 M | 780 | 4 D: 4885 | 6 D: 5238 | 8738 |

Table 4 provides working time, set time, and compressive strength for mortar produced using alkali activators sodium hydroxide and sodium silicate with chemical additive Aluminum Sulfate.

TABLE 4

Sodium hydroxide and Sodium Silicate with chemical additive, Aluminum Sulfate
Slag (GGBFS) activation

| Example | Data | Working time, Min | Final set, Min | Compressive strength, Psi | | | |
|---|---|---|---|---|---|---|---|
| | | | | 24 H | 3 D | 7 D | 28 D |
| Comparative Example 4 | Slag/classF (87/13), Sodium Hydroxide 3%, Sodium silicate 5% Control Mix (No chemical additive) | 20 Min | 2 H: 17 M | 3000 | 2 D: 3555 | 5819 | 7750 |

TABLE 4-continued

Sodium hydroxide and Sodium Silicate with chemical additive, Aluminum Sulfate Slag (GGBFS) activation

| Example | Data | Working time, Min | Final set, Min | Compressive strength, Psi | | | |
|---|---|---|---|---|---|---|---|
| | | | | 24 H | 3 D | 7 D | 28 D |
| Example 16 | Slag/classF (87/13), Slag lot 020516 (Rowen/Essroc) Sodium Hydroxide 3%, Sodium Silicate 5%, Aluminum Sulfate 0.25% | 1 H: 10 M | 5 H: 39 M | 2001 | 3083 | 4227 | 5850 |
| Example 17 | Slag/classF (87/13), Sodium Hydroxide 3%, Sodium Silicate 5%, Aluminum Sulfate 0.5% | 1 H: 40 M | 7 H | 1858 | 4 D: 4314 | 4674 | 6383 |
| Example 18 | Slag/classF (87/13), Sodium Hydroxide 3%, Sodium Silicate 5%, Aluminum Sulfate 1% | 2 H: 27 M | 10 H: 36 M | 2258 | 4625 | 5910 | 7530 |
| Example 19 | Slag/classF (87/13), Sodium Hydroxide 3%, Sodium Silicate 5%, Aluminum Sulfate 1.5% | >8 H | 26 H | 0 | 4 D: 5427 | 6646 | 8549 |

The following Table 5 provides the flow retention for various slag mortars.

TABLE 5

Slag Mortar flow % (ASTM C 1437) at different strokes and different time

| | (Comp. Example 5) NaOH 2.75% Na Silicate 4.5% | | | | (Example 20) NaOH 2.75% Na Silicate 4.6% Sodium Lactate 2.6% | | | | (Example 21) NaOH. 2.75% Na Silicate 4.6% Alum 0.5% | | | |
|---|---|---|---|---|---|---|---|---|---|---|---|---|
| Time | 0 stroke | 5 stroke | 10 stroke | 25 stroke | 0 stroke | 5 stroke | 10 stroke | 25 stroke | 0 stroke | 5 stroke | 10 stroke | 25 stroke |
| Initial | 9 | 56 | 82 | 122 | 8 | 62 | 92 | 136 | 8 | 58 | 85 | 123 |
| 30 Min | 4 | 12 | 15 | 32 | 4 | 20 | 38 | 70 | 4 | 32 | 53 | 96 |
| 1 H | | Not workable | | | | Not workable | | | 4 | 22 | 32 | 67 |
| 1 H: 30 M | | | | | | | | | 4 | 20 | 28 | 50 |
| 2 H | | | | | | | | | | Not workable | | |

Additional Slag Mortar Examples

Example 22

| | |
|---|---|
| GGBFS (Slag): | 78.38% |
| Class F fly ash: | 11.72% |
| Sodium Hydroxide: | 2.70% |
| Sodium Silicate: | 4.5% |
| Sodium Lactate (liq): | 2.70% |
| Total Slag Cement: | 100% |

Slag Mortar

| | |
|---|---|
| 1 part Slag Cement + 2 part ASTM C 33 sand Water: | 38.5% of Slag cement |
| Results: | |
| Working time: | 82 minutes |
| Final Set time: | 5 H:19 M |

Compressive strength

| | |
|---|---|
| 1-day: | 2440 psi |
| 7-day: | 5202 psi |
| 28-day: | 7241 psi |

Example 23

| | |
|---|---|
| GGBFS (Slag): | 80.17% |
| Class F fly ash: | 12% |
| Sodium Hydroxide: | 2.76% |
| Sodium Silicate: | 4.61% |
| Alum: | 0.46% |
| Total Slag Cement: | 100% |

Slag Mortar

| | |
|---|---|
| 1 part Slag Cement + 2 part | 38.5% of Slag cement |

-continued

| ASTM C 33 sand Water: Results: | |
|---|---|
| Working time: | 4 H |
| Final Set time: | 9 H:30 M |
| Compressive strength | |
| 1-day: | 2148 psi |
| 7-day: | 5425 psi |
| 28-day: | 7895 psi |

Example 24

| GGBFS (Slag): | 79.81% |
|---|---|
| Class F fly ash: | 11.93% |
| Sodium Hydroxide: | 2.75% |
| Sodium Silicate: | 4.59% |
| Aluminum Sulfate: | 0.92% |
| Total Slag Cement: Slag Mortar | 100% |
| 1 part Slag Cement + 2 part ASTM C 33 sand Water: Results: | 38.5% of Slag cement |
| Working time: | 2 H:27 M |
| Final Set time: | 10 H:36 M |
| Compressive strength | |
| 1-day: | 2258 psi |
| 7-day: | 59.10 psi |
| 28-day: | 7510 psi |

Figure 2:
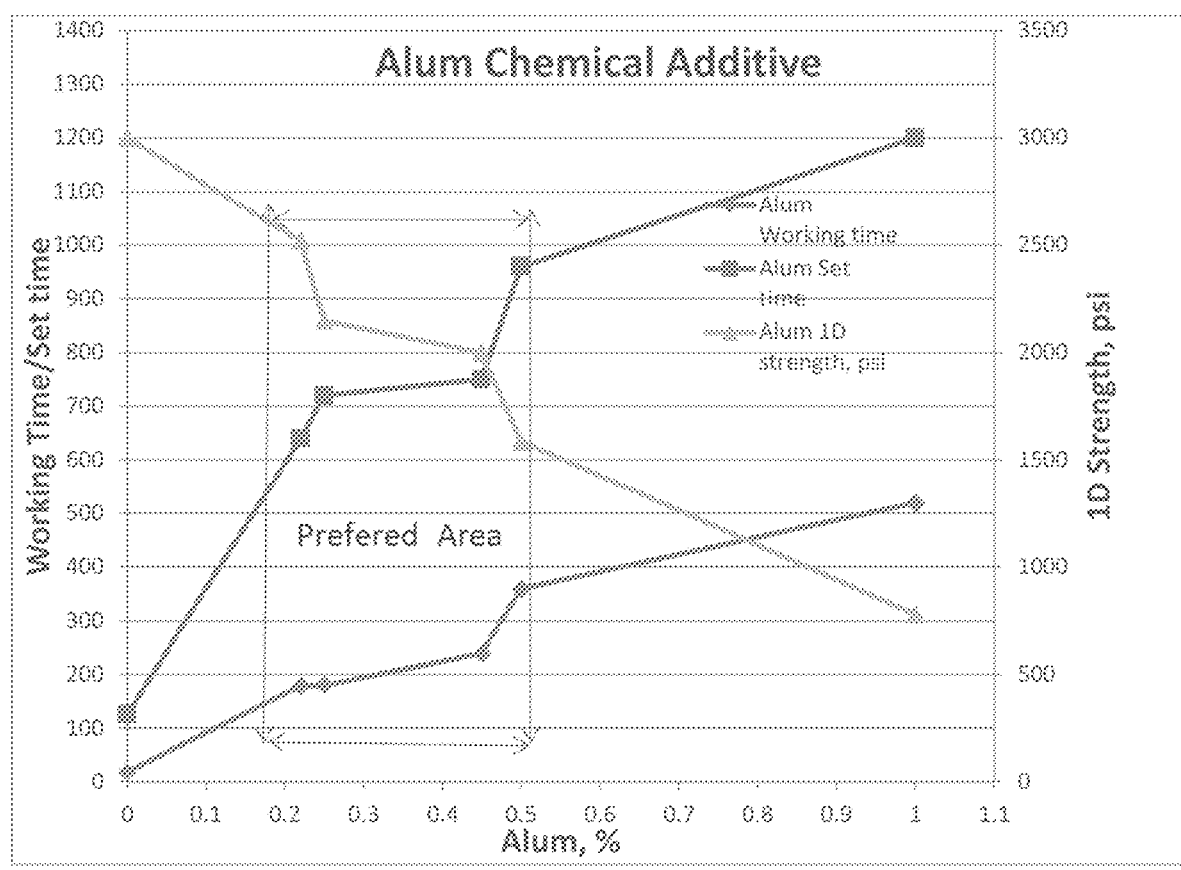
FIG. 2 is a chart illustrating the alum percentage versus the working time, the set time, and 1 D compressive strength of mortar formed with alum additive.
Figure 3:
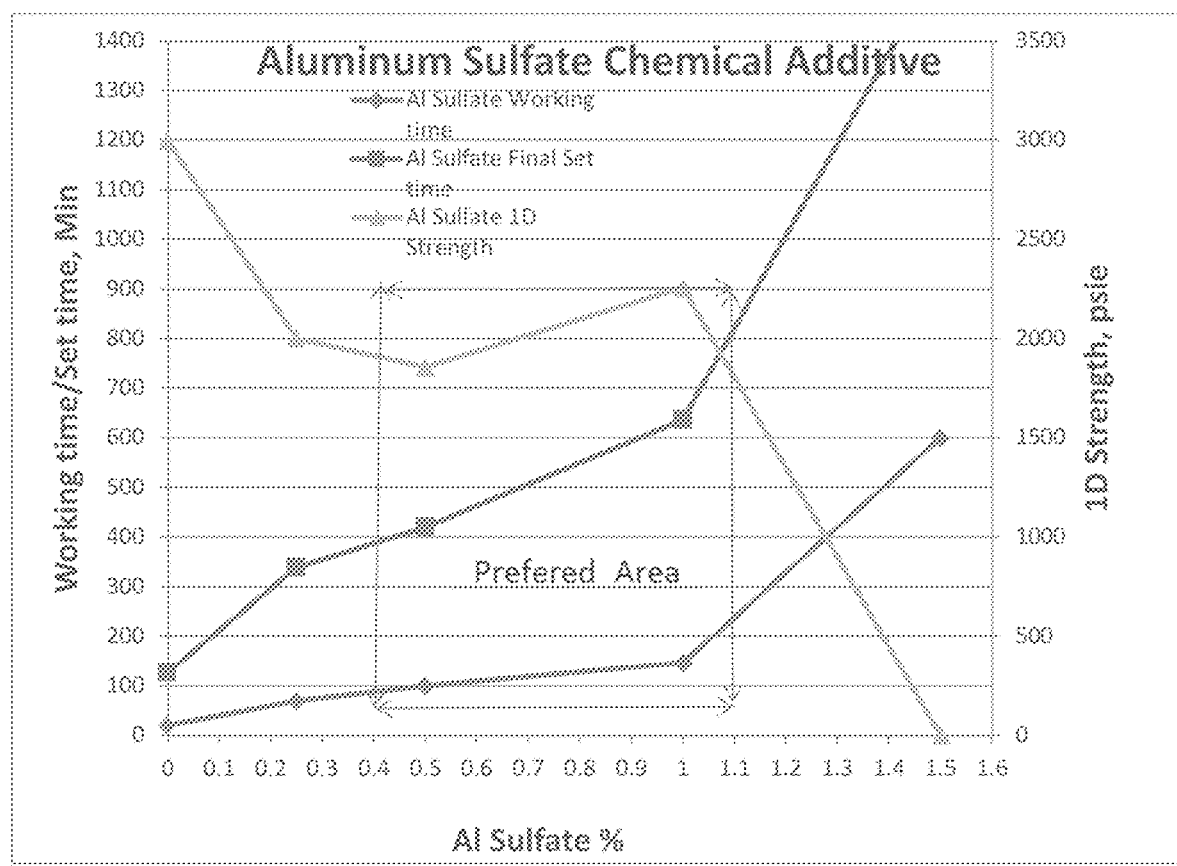
FIG. 3 is a chart illustrating the aluminum sulfate percentage versus the working time, the set time, and 1 D compressive strength of mortar formed with aluminum sulfate additive.

From the various Slag Mortar Examples above, FIGS. 1-3 were produced to illustrate the preferred amount of sodium lactate, alum, and aluminum sulfate in the cementitious composition with respect to working time, set time, and ID compressive strength.

Concrete Examples

Cement ingredients: slag (GGBFS); ASTM Class F Fly Ash; Sodium Hydroxide; Sodium Silicate or Sodium Carbonate; and a chemical additive such as Alum ($KAl(SO_4)_2$), Aluminum Sulfate, or Sodium Lactate Liquid (60% solids content).

Concrete mix proportions were prepared as per the guideline of ACI 211. The following Table 6 provides various concrete mix proportions and properties.

TABLE 6

| Concrete Mix Proportion | | | |
|---|---|---|---|
| | Specific gravity | lb/cy | kg/m3 |
| Cement | 2.85 | 750 | 445 |
| Fine agg, ASTM C 33 | 2.63 | 1220 | 724 |
| Coarse agg. ASTM #57, Lime stone | 2.72 | 1685 | 999.7 |
| Water | 1 | 258 | 153 |

Concrete Test Methods: Slump=ASTM C 143; Working time=time interval between addition of water to concrete reach 2 inch slump; Time of Set=ASTM C 403; Compressive Strength=ASTM C 39; Flexural Strength=ASTM C 78; Splitting Tensile Strength=ASTM 496; Modulus of Elasticity=ASTM 469; Bond Strength (slant shear)=ASTM C 882; Length Change=ASTM C 157; Rapid Chloride Permeability=ASTM C 1202.

The following Table 7 provides the slump retention of slag concrete created with the chemical additives disclosed herein.

TABLE 7

| Concrete Slump Retention | | | | | | | |
|---|---|---|---|---|---|---|---|
| All mixes: 75: 25slag: flyash 750 lb/yd3 | Initial slump. Inch | Slump at 30 Min, inch | Slump at 1 H, Inch | Slump at 1.5 H, Inch | Slump at 2 H, Inch | Slump at 3 H, Inch | Time to retain 2" slump |
| Sodium hydroxide: Sodium Silicate 2.5: 4.6 | 6.5 | 1.5 | 1 | | | | Less than 30 Min |
| Sodium hydroxide: Sodium Silicate 2.5: 4.6 Sodium Lactate 2.6 | 8.25 | 6 | 5 | 2.75 | 2 | | 2 H |
| Sodium hydroxide: Sodium Silicate 2.5: 4.6 Alum 0.5% | 4.5 | 4 | 4 | 4 | 4 | 3 | Greater than 3 H |
| Sodium hydroxide: Sodium Silicate2.5: 4.6 Aluminum sulfate 0.5% | 5 | 5 | 4 | 4 | 4 | 3 | Greater than 3 H |

Table 7 indicates that workability retention of concretes made with the cementitious compositions described herein is more than 3 hours at 73° F. The control alkali activated slag cement concrete loses workability in less than 30 minutes.

Portland cement can be tested with ASTM C 150, "Standard Specification for Portland Cement". All other non-Portland cements can be tested with a performance based specification ASTM C 1157. The following Table 8 provides results of slag cement with alum as the chemical additive. The Example 25 tested in Table 8 has the following weight percentages: GGBFS (slag)=69.13%; Class F fly ash=23.04%; Sodium Hydroxide=2.77%; Sodium Silicate=4.6%; Alum=0.46%.

TABLE 8

Slag Cement Data

| Property | Method | General Use specification | High Early strength Specification | Moderate Sulfate Resistance Specification | High Sulfate Resistance Specification | Example 25 |
|---|---|---|---|---|---|---|
| Flow | ASTM C1437 | 110 +/− 5% | 110 +/− 5% | 110 +/− 5% | 110 +/− 5% | 110% |
| Vicat Set Time. min | ASTM C191 | 45-420 | 45-420 | 45-420 | 45-420 | 180 |
| 1-day compression. psi | ASTM C109 | NA | 1450-2900 | NA | NA | 1688 |
| 3 - day compression. psi | ASTM C109 | 1450-2900 | 2465-4350 | 1450-2900 | 725-2175 | 2470 |
| 7 - day compression. psi | ASTM C109 | 2465-4350 | NA | 2465-4350 | 1450-2900 | 2654 |
| 28-day compressive strength | ASTM C109 | NA | NA | NA | 2465-4350 | 3464 |
| Mortar Bar Expansion | ASTM C1038 | Max 0.02% @ 14 days | Max 0.02% @ 14 days | Max 0.02% @ 14 days | Max 0.02% @ 14 days | 0.007% |
| Air Content of Mortar | ASTM C185 | Report value | Report value | Report value | Report value | 5% |
| Fineness: Residue on 325 mesh | ASTM C430 | Report value | Report value | Report value | Report value | 15% |
| Fineness: Blaine | ASTM C204 | Report value | Report value | Report value | Report value | 3500 cm2/g |
| Autoclave Expansion | ASTM C151 | 0.8% max | 0.8% max | 0.8% max | 0.8% max | (—)0.065% |
| Sulfate expansion (Sulfate resistance). % 6 Months | ASTM C 1012 | NA | NA | Max 0.1% | Max 0.05% | 0.02% |
| 1 year | | | | NA | Max 0.1% | 0.03% |

As indicated in the above Table 8, the cement of Example 25 meets and exceeds the ASTM C 1157 standard (a performance based specification of hydraulic cement) for all four categories: (1) general use; (2) high early strength; (3) moderate sulfate resistance; and (4) high sulfate resistance.

Additional Slag Concrete Examples

Example 26

| GGBFS (Slag): | 69.13% |
|---|---|
| Class F fly ash: | 22.05% |
| Sodium Hydroxide: | 2.76% |
| Sodium Silicate: | 4.6% |
| Alum: | 0.46% |
| Total Slag Cement: | 100% |

Concrete Mix proportion

| Slag Cement: | 750 lb/Y³ (445 kg/m³) |
|---|---|
| Fine aggregate: | 1120 lb/Y³ (724 kg/m³) |
| Coarse Aggregate: | 1685 lb/Y3 (100 kg/m3) |
| Water: | 31.1 gallon/Y3 (153 lit/m3) |

Results:

| Slump: | 5 inches |
|---|---|
| Working time: | 90 min |
| Initial set time: | 3 H:0 M |
| Final set time: | 7 H:50 M |

Compressive strength (ASTM C 39)

| 1-day: | 2227 psi |
|---|---|
| 7-day: | 4217 psi |
| 28-day: | 5643 psi |

Flexural Strength (ASTM C-78)

| 7-day: | 610 psi |
|---|---|
| 28-day: | 661 psi |

| | |
|---|---|
| Splitting Tensile (ASTM C 496) | |
| 7-day: | 483 psi |
| 28-day: | 604 psi |
| Modulus of Elasticity (ASTM C 469) | |
| 7-day: | 4.54 millions psi |
| 28-day: | 4.63 millions psi |
| Bond Strength (Slat shear) (ASTM C 882) | |
| 7-day: | 773 psi |
| 28-day: | 797 psi |
| Length Change (ASTM C 157) | |
| 7-day: | −0.034% |
| 28-day: | −0.041% |
| Rapid Chloride Permeability (ASTM C 1202): | 549 Coulombs |

This application discloses several numerical ranges in the text and figures. The numerical ranges disclosed inherently support any range or value within the disclosed numerical ranges, including the endpoints, even though a precise range limitation is not stated verbatim in the specification because this disclosure can be practiced throughout the disclosed numerical ranges.

The above description is presented to enable a person skilled in the art to make and use the disclosure, and is provided in the context of a particular application and its requirements. Various modifications to the preferred embodiments will be readily apparent to those skilled in the art, and the generic principles defined herein may be applied to other embodiments and applications without departing from the spirit and scope of the disclosure. Thus, this disclosure is not intended to be limited to the embodiments shown, but is to be accorded the widest scope consistent with the principles and features disclosed herein. Finally, the entire disclosure of the patents and publications referred in this application are hereby incorporated herein by reference.

The invention claimed is:

1. A cementitious composition comprising:
   a slag;
   a pozzolanic material;
   an alkali activator comprising sodium hydroxide and sodium silicate or sodium carbonate, the sodium hydroxide is 1-5 wt. % of the cementitious composition, and the sodium silicate or sodium carbonate is 1-9 wt. % of the cementitious composition; and
   a sulfate or selenate compound of the formula:

(a) $AB(SO_4, SeO_4)_2$—$XH_2O$, where A=K, Na, or $NH_4$; B=Al, Cr, Fe, or Co; and X=0-12; or (b) $B_2(SO_4, SeO_4)_3$—$XH_2O$, where B=Al, Cr, Fe, or Co and X=0-12.

2. The cementitious composition of claim 1, wherein A=K, B=Al, and X=12.

3. The cementitious composition of claim 1 wherein B=Al.

4. The cementitious composition of claim 1, wherein the sulfate or selenate compound is $KAl(SO_4)_2$—$XH_2O$.

5. The cementitious composition of claim 4, wherein the weight percentage of $KAl(SO_4)_2$-$12H_2O$ in the cementitious composition is 0.1-10 wt. %.

6. The cementitious composition of claim 1, wherein the sulfate or selenate compound is $Al_2(SO_4)_3$.

7. The cementitious composition of claim 6, wherein the weight percentage of $Al_2(SO_4)_3$ in the cementitious composition is 0.1-10 wt. %.

8. The cementitious composition of claim 1, wherein the slag is a ground granulated blast furnace slag.

9. The cementitious composition of any of claims 1-8, wherein the pozzolanic material is selected from the group consisting of class F fly ash, silica fume, natural pozzolans, glass, calcined clay and mixtures thereof.

10. The cementitious composition of claim 1, wherein the weight ratio of slag to pozzolanic material in the cementitious composition is from about 90/10 to about 50/50.

11. A mortar formed by a combination including water, sand, and the cementitious composition of claim 1.

12. The mortar of claim 11, wherein the working time of the mortar is 60-240 minutes.

13. The mortar of claim 11, wherein the set time is 4-12 hours.

14. The mortar of claim 11, wherein the 1D compressive strength is greater than 1500 psi, the 7D compressive strength is greater than 3000 psi, and the 28D compressive strength is greater than 4000 psi.

15. A concrete formed by a combination including water and the cementitious composition of claim 1.

* * * * *